United States Patent
Tillner

(10) Patent No.: US 10,934,156 B2
(45) Date of Patent: Mar. 2, 2021

(54) FOAM CORE FOR A CUSHION OF A SEAT PART OR A RECLINING PART OR A BACK REST OF A PIECE OF UPHOLSTERED FURNITURE OR A MOTOR VEHICLE SEAT

(71) Applicant: OKE GROUP GMBH, Hoerstel (DE)

(72) Inventor: Thomas Tillner, Osnabrück (DE)

(73) Assignee: OKE GROUP GMBH, Hoerstel (DE)

( * ) Notice: Subject to any disclaimer, the term of this patent is extended or adjusted under 35 U.S.C. 154(b) by 296 days.

(21) Appl. No.: 16/087,946

(22) PCT Filed: Jan. 30, 2017

(86) PCT No.: PCT/EP2017/025015
§ 371 (c)(1),
(2) Date: Sep. 24, 2018

(87) PCT Pub. No.: WO2017/162339
PCT Pub. Date: Sep. 28, 2017

(65) Prior Publication Data
US 2019/0047844 A1     Feb. 14, 2019

(30) Foreign Application Priority Data

Mar. 24, 2016  (DE) ...................... 10 2016 003 492.0
Apr. 22, 2016  (DE) ...................... 10 2016 004 907.3
May  4, 2016   (DE) ...................... 10 2016 005 387.9

(51) Int. Cl.
*B68G 11/06*   (2006.01)
*A47C 27/20*   (2006.01)
*B60N 2/70*    (2006.01)

(52) U.S. Cl.
CPC .............. *B68G 11/06* (2013.01); *A47C 27/20* (2013.01); *B60N 2/70* (2013.01); *B60N 2/707* (2013.01); *B60N 2/7094* (2013.01)

(58) Field of Classification Search
CPC ... A47C 27/0453; A47C 27/05; A47C 27/065; A47C 23/06; A47C 31/10; A47C 31/105;
(Continued)

(56) References Cited

U.S. PATENT DOCUMENTS 4,161,045 A * 7/1979 Regan .................. A47C 27/148
                                                            5/727
5,785,303 A    7/1998 Kutschi
(Continued)

FOREIGN PATENT DOCUMENTS

AT         310577 B    10/1973
CN       202182139 U    4/2012
(Continued)

*Primary Examiner* — Eric J Kurilla
*Assistant Examiner* — James T Coble
(74) *Attorney, Agent, or Firm* — David S. Safran; Roberts Calderon Safran & Cole, P.C.

(57) ABSTRACT

A foam core (12) for a cushion (8, 9) of a seat part (2) or a reclining part or a back rest (3) of a piece of upholstered furniture (1) or a motor vehicle seat (11) or for a mattress or support surface of a piece of reclining furniture, with a core base (13) of foam material, in particular of cold foam, visco foam, latex foam or molded foam, there being in the core base (13) a plurality of spring strips (14) which run preferably at least essentially parallel to one another. It is provided that at least one spring strip (14) has an in particular pultruded fiber core (20) which has preferably glass fibers, and a mantle (21) of a thermoplastic material, in particular of polypropylene, which surrounds the fiber core (20).

11 Claims, 5 Drawing Sheets

(58) Field of Classification Search
CPC ......... A47C 27/16; A47C 23/063; A47C 7/20;
A47C 27/14; A47C 27/148; B68G 11/06
See application file for complete search history.

(56) References Cited

U.S. PATENT DOCUMENTS

2006/0123553 A1* 6/2006 Jansen ................. A47C 27/148
5/727
2017/0112293 A1* 4/2017 Battaglia ............... A47C 27/14

FOREIGN PATENT DOCUMENTS

| | | | |
|---|---|---|---|
| DE | 1925863 A1 | 11/1970 | |
| DE | 2855241 A1 | 6/1980 | |
| DE | 202007008867 U1 | 8/2007 | |
| EP | 0670128 A1 | 9/1995 | |
| EP | 1285607 A1 | 2/2003 | |
| EP | 2865296 A1 * | 4/2015 | ........... A47C 23/064 |
| GB | 2096458 A | 10/1982 | |

* cited by examiner

FOAM CORE FOR A CUSHION OF A SEAT PART OR A RECLINING PART OR A BACK REST OF A PIECE OF UPHOLSTERED FURNITURE OR A MOTOR VEHICLE SEAT

BACKGROUND OF THE INVENTION

Field of the Invention

The invention relates to a foam core for a cushion of a seat part or a reclining part or a back rest of a piece of upholstered furniture or a motor vehicle seat or for a mattress or support surface of a piece of reclining furniture, with a core base of foam material, in particular cold foam, comfort foam, visco foam, latex foam or molded foam, there being in the core base a plurality of spring strips which run preferably at least essentially parallel to one another. Here, cold foam, comfort foam and molded foam can be produced from PU or PUR, while latex foam can be produced from natural or synthetic latex. Furthermore, the invention relates to a cushion with a foam core of the aforementioned type and to a piece of upholstered furniture, in particular furniture for sitting or reclining, or a motor vehicle seat with a foam core or a cushion of the aforementioned type.

Description of Related Art

The so-called cushion structure describes the individual layers and the materials used which are employed in the cushioning of upholstered furniture, in particular furniture for sitting and reclining, and also mattresses, but fundamentally also in motor vehicle seats. The most common materials are foam, spring core, spring insert, cushion wadding and insulating felt. The lower termination of the cushion structure is formed by the so-called lower cushioning which bears the aforementioned materials.

Conventional upholstered furniture supports which are also called lower cushioning or cushioning base are rubber belts which are relatively soft, zigzag springs which have medium hardness, and textile belts or wooden spring strips which are considered hard. Wooden spring strips correspond to the slat grid of beds. Fundamentally the support can also be a simple wooden slab which generally consists of hard fiber material which enables the least sinking-in depth since it does not give at all. In vehicle seats so-called Pullmaflex cushioning is used, in particular in mat form, as the support.

In the choice of the cushioning structure, among others the later yielding of the padding plays a part. A soft sitting surface which enables deep sitting generally never has a wooden spring strip as the lower cushioning, but as the upper padding a foam block and as the lower cushioning conventionally rubber belts and also zigzag springs which are also tensioned over a long distance. Furthermore, pocket springs which can be employed above the cushion base are used. Pocket springs can also replace part of the foam of the upper padding. Pocket springs are used in particular in furniture for sitting and mattresses, but also sometimes in vehicle seats.

Conversely, firm padding conventionally has a spring insert on a foam block as the upper cushion and zigzag springs tensioned over a short distance, textile belts, wooden spring strips or a wooden slab as the lower cushioning. Here the sinking-in behavior is then accordingly small.

The most frequently used lower cushioning of upholstered furniture is (steel) zigzag springs. Zigzag springs which are used besides Pullmaflex mats also in vehicle seats are used as the resilient foundation both for flat cushions and also for tall padding with spring core. They are used as the lower cushioning of seats and also in back rest padding. Zigzag springs are generally produced in roll form as a ring with a total length of roughly 30 m. While the width of the zigzag spring is always uniform and need not be taken into account, the magnitude of the wire thickness by which the hardness or softness of the later padding is influenced must always be considered. Thin wire thicknesses (for example, roughly 2.8 mm) are used solely for back padding. Seat padding requires a foundation with thicker zigzag springs with a wire thickness of roughly 3.6 or 4.0 mm.

For installation in furniture or a motor vehicle seat, the first working step is to establish the number of required zigzag springs which run next to one another from the front to the rear edge. The distances between the springs are generally between 70 mm and 135 mm. On this basis, for an edge 40 cm wide four zigzag springs are needed. This distance describes the distance of the middle of the spring to the middle of the next spring, therefore not the actual intermediate space from spring to spring.

The next working step is the measurement of the required length of the zigzag springs. This can be done most easily with a so-called folding rule since the springs are to assume a slight arch and an inch rule can be placed accordingly with a slight arc from the back and front edge. The ascertained amount is cut off from the zigzag spring ring in the corresponding number by a bolt cutter. Since the severed arcs always point in the direction in which the zigzag springs run due to the continuous fabrication of the product, these ends must be bent with a special bending device such that the outer end arcs point to the inside, therefore in the direction of the later cushion base. This is necessary since the springs otherwise can slip out of their holders (clips) under strong loading. The zigzag springs are first attached to the rear edge of the frame. To do this plastic or metal clips, also called hinges, are tacked on at the corresponding positions or are classically attached with large pin belts and/or harpoon nails.

Various clips or clip strands with several clips with fixed distances are known from the prior art. Some versions are tacked on singly or in pairs, others are only tacked on one time, then the spring is hung in the clip, the upper part of the clip is bent out and closed with two more tack clamps.

After the individual hinges are fastened at the correct positions on the front edge, the zigzag springs can be hung with high tension. There are various aids and special tools for this strenuous work. Traditionally, in the prior art a tear-resistant loop is used which is threaded into the front arc of the spring. Then, via the loop of the spring it is pulled lengthwise enough to be able to hang in its clip on the front edge. All zigzag springs are then hung in this way. It may be necessary for a second individual to hold the cushion frame in this working step, since lightweight frames can tilt and slip under the extreme tensile loading until a spring is hung.

Zigzag springs ideally always lie in pairs symmetrically next to one another. For two adjacent springs the closed and open arcs always lie directly opposite one another. This enables the final connection of the various springs to stable rubber rings or to the through-lacing of the zigzag springs with threads, which lacing runs repeatedly transversely, so that uneven, rather spot loading of the later cushion on the cushion base is distributed over a greater area. For the lacing-through, a relatively long lacing thread is attached on one side edge and routed to the opposite edge, whereby each spring is knotted and the thread end is fastened on the opposite side.

This is followed by covering of the zigzag spring base with a heavy tensioning cord or spring cord. It is cut to size and stitched at the top. But since not all upholstered furniture is sealed with clamping material and a glance under the finished furniture should offer a clean working picture, the cord is driven in upward in subsequent fastening. If front and back supports should be in the way in subsequent covering with spring cords, the cord must be notched simply or in a Y-shape in these corners before fastening.

Altogether the attachment of lower cushioning with zigzag springs in furniture is very complex. This applies accordingly to the use and mounting of zigzag springs in vehicle seats. The attachment of Pullmaflex mats or pocket spring cores in motor vehicle seats, upholstered furniture and mattresses is however also often problematic.

Otherwise it is disadvantageous in particular in Pullmaflex cushioning or mats that they require a bracing nonwoven material since otherwise they would cut into the foam of the upper padding.

Belt straps or cushion belts are used basically as cushion supports for seat and back rest padding, but are used mainly in back rests since they tend to be more elastic that the above described zigzag springs. Belts are also used for extravagantly shaped elements with radii which can only be poorly supported with zigzag springs, or in upholstered furniture in which especially comfortable sitting is desired.

Belts consist of different materials with different elasticity. For the structure of the lower padding, in classic padding and in spring core, flat and foam padding, generally inelastic textile belts are used which usually consist of hemp or jute. For the structure of elastic back and seat padding, generally woven rubber or solid rubber belts are used in strap widths between 30 and 80 mm, up to 150 mm and with different flexibility. Generally, very flexible rubber straps are used for the back region and less flexible belts for the seat region.

When using cushion belts, belt widths and elasticities must also be computed first and then measured and marked for each seat. The cushion belt is then fastened on the base frame of the piece of furniture as the belt base (less elastic), rubber belt strap (elastic) or rubber fabric (for closed cushion base). The cushion belts are not simple fastened next to one another, but are interwoven horizontally and vertically into a belt base. They are tensioned crosswise and fastened with a tacker or special belt nails (belt pins). For example, belt tensioners are used as aids in the strenuous manual tensioning and fastening. On the upper edge they have steel tips which are stabbed through the belt in the tensioning process. On the other end of the tool is a slip-resistant support surface which is placed on the edge of the wood frame. In this way the degree of tensioning can be estimated and the belts can be fastened with tension as uniform as possible.

The attachment of cushion belts is also relatively complex in practice.

Furthermore, wooden spring strips are used as the lower cushioning, but in general only for furniture with long surfaces, in particular beds and in upholstered furniture with an integrated bed function. Here, the individual wooden spring strips are arranged in parallel and at a distance from one another, and are held either on a frame or are connected to one another in general via two fabric belts which run transversely to the spring strips. The spacing and the relative arrangement of the individual spring strips to one another are ensured via the frame and the fabric belts. This structure with an outer frame is comparatively complex and takes up a relatively large amount of space; this makes storage and transport difficult.

However, keeping the wooden spring strips together via belts is also known. This yields a very simple structure and otherwise enables such a cushion base to be rolled up. In any case, the aforementioned cushion base structure with the belts running transversely to the wooden spring strips has the disadvantage that in this case a defined position of the individual wooden spring strips to one another in the installed state can hardly be permanently achieved.

In the aforementioned cushion base structure, the spring strips generally are formed of wood. In order to be able to achieve a high bearing capacity, the wooden spring strips must have a pre-curvature towards the middle. At different widths of the cushion base, this leads to wooden spring strips of different length and thus different curvatures having to be held up.

Otherwise, in general, on a cushion base of the aforementioned type there must be a support surface protector as the intermediate layer between the support surface (padding) and the cushion base. This support surface protector is generally used to protect the bottom of the support surface.

In motor vehicle seats there is generally no cushion base of the above described type, as in furniture for sitting. Conventionally, Pullmafiex cushioning which is formed by wire connections, often also short zigzag springs or pocket springs, is used. Conventionally, the structure from the outside to the inside is as follows: Metal shell with cushioning, optionally nonwoven, foam, nonwoven material, covering.

German Patent Application DE 19 25 863 A discloses a cushion body of foamed plastic which can be inserted into a bearing frame, the spring strips which assume the support of the cushion body on the frame being foamed into the cushion body at a distance from the support surface. The cushion body can be used both in a mattress and also in couch or armchair structures.

Austrian Patent AT 310 577 B discloses a cushion body and a method for producing it, spring supports being embedded over their entire extension in the foam of the cushion body and being surrounded on all sides by the foam of the cushion body.

Furthermore, German Utility Model DE 20 2007 008 867 U1 discloses an arrangement with a bed frame and a combination mattress, in the mattress there being through openings into which slats are inserted which run transversely to the reclining direction and parallel to the reclining surface through the mattress.

In the aforementioned cushion bodies, production in conjunction with the spring strips used there is complex and thus expensive. Furthermore, to some extent the cushioning comfort is only conditionally good.

SUMMARY OF THE INVENTION

At this point, the object of this invention is to simplify in part the rather complex structure of a piece of upholstered furniture (furniture for sitting or reclining) or of a motor vehicle seat and to otherwise increase the comfort of sitting or reclining.

This object is achieved in accordance with the invention by a foam core which ultimately constitutes the basic element of the cushion, regardless of whether it is used for a seat part, a reclining part or a back rest of a piece of upholstered furniture, for a mattress or support surface of a piece of reclining furniture or a motor vehicle seat.

In accordance with the invention, it is provided that the spring strips are produced in a special way from a fiber-reinforced plastic material, in particular in the form of a fiber composite core. The preferably pultruded fiber core which has in particular glass fibers is surrounded by a thermoplastic matrix. The fiber core is used as a reinforcing element and largely defines the elasticity of the spring strips. It can be made as a hollow tube or also as a filled strand. Depending on the required elasticity it has a larger or smaller diameter. The elasticity can also be influenced by the cross sectional shape. Here, the shape of the fiber core is not limited to round or elliptical cross sections. Angular, in particular rectangular cross sections, are also possible. Based on the fiber core and the matrix which surrounds the fiber core, relatively thin, but still very supportive spring strips which are made straight and not curved beforehand can be made available.

Due to the material combination of the fiber core with the surrounding mantle matrix in accordance with the invention, different degrees of elasticity of the spring strip with a uniform outer geometry of the spring strip can be ensured. For example, if relatively high strengths are required, a thicker fiber core and/or a fiber core with a different cross sectional shape can be used, while the surrounding mantle material is then thinner. In terms of outside tolerances then there is no difference from a spring strip in which a thinner fiber core and a thicker mantle are used.

Moreover, in accordance with the invention, it is easily possible for there to be spring strips with different degrees of elasticity in the foam core. If necessary, at sites at which higher loads occur, harder spring strips can be used. Spring strips provided on the foam core on the edge side can [have] higher elasticity and/or can be made less stiff than spring strips provided in the central region. At sites at which the greatest force due to weight can be expected, harder and/or stiffer spring strips should be provided.

Otherwise, in the spring strip in accordance with the invention it is such that it can be produced very easily and economically. Since, as was stated above, pre-curvatures or pre-stresses are not necessary, lengths of the spring strip which are required for different widths of the foam core can be easily produced, for example, by cutting off the necessary spring strip length from a (continuous) strand which has been produced for example by pultrusion.

For the different materials of the fiber core and of the mantle, it must be ensured that the two components are also joined to one another after production of the spring strip enough to be able to ultimately ensure the necessary strength and bearing properties. In pultruded spring strips, very good adhesion of the two components to one another arises by the cooling and shrinkage of the material of the mantle after pultrusion so that in this way good coherence of the two components is good. To further improve the adhesion of the two components to one another, in one preferred configuration of the invention it is provided that the fiber core of the spring strip has a fiber core strand in particular with an at least essentially round or elliptical cross section, whereby around the fiber core strand there is a helically running winding at least in part. Preferably, the helical winding extends over the entire length of the fiber core strand. Since the winding belongs to the fiber core, it also consists of fibers.

In conjunction with the winding, it is preferably provided that adjacent turns of the winding are spaced without contact apart from one another. This yields intermediate spaces between adjacent turns of the winding so that interlocking for the mantle material becomes possible. If in the production of the spring strip the mantle material is routed around the fiber core, the mantle material penetrates into the empty spaces between adjacent turns so that reliable joining between the two materials results. In particular, this is important in the production of the spring strip in accordance with the invention, since the different materials of the fiber core and of the mantle have different shrinking behavior when cooled and the detachment of one material from the other is prevented by the aforementioned interlocking.

In accordance with the invention, the resilient and/or elastic element is integrated directly into the foam core and/or its core base and is enclosed in it. It should be expressly pointed out that the cushion in accordance with the invention can ultimately be one which can be used for a seat part or a reclining part or a back rest of a piece of upholstered furniture and in the same way for the seat part or the back rest of a motor vehicle seat. Otherwise, the cushion in accordance with the invention is also ultimately a mattress or a support surface of a piece of reclining furniture so that following statements with respect to a cushion apply in the same way to a mattress or support surface of a piece of reclining furniture, even if this is not specifically stated. In particular, in conjunction with a mattress or support surface in connection with a bed as a piece of reclining furniture, in the invention the major advantage arises that separate lower cushioning in the form of a slat grid can be omitted. This of course applies in the same way to the other indicated applications in which likewise separate lower cushioning is not necessary since the lower cushioning function is assumed by the foam core by the spring strips which are integrated in the base.

In the foam core in accordance with the invention, a layer structure thus arises in the form of foam—spring strips—foam. The configuration in accordance with the invention offers essentially the advantage that cushions or mattresses/support surfaces which have a foam core in accordance with the invention are placed directly on corresponding edges on the seat part, on the reclining part, or the back rest of the piece of upholstered furniture, on the piece of reclining furniture or on the metal structure and/or frame of the vehicle seat, and especially on the seat part and/or the back rest, and can be supported there in the corresponding manner. Here, it goes without saying that the edges opposite one another can also be part of a circumferential frame or a corresponding shell. In any case, when using the foam core in accordance with the invention the lower cushioning provided in the prior art can be completely omitted. In particular, when using the foam core in accordance with the invention lower cushioning in the form of belts, zigzag springs, pocket spring cores, Pullmaflex mats, wooden strips, slat grids and/or wooden slabs can be omitted. This is especially effective in terms of production engineering since the effort necessary in the prior art to produce and attach lower cushioning is completely eliminated. But the invention yields not only advantages in production engineering. The spring strips provided in the core base ensure the corresponding comfort when sitting or leaning since the spring strips are already inherently elastic and they additionally cushion by the foam located underneath the spring strips.

In conjunction with the foam core in accordance with the invention it has been established that it is advantageous if the spring strips extend lengthwise or transversely between the front and back end face of the core base. In the state inserted and/or installed for example in the seat part, the longitudinal or transverse arrangement should then be understood with reference to the front seat edge of the seat part. In addition, or alternatively, the spring strips are located preferably at least essentially parallel to the bottom and/or top of the core base. It has been ascertained that the aforementioned arrangement in the indicated direction of extension ultimately leads to a high level of comfort in sitting, reclining and/or supporting.

In one preferred configuration of the invention, it is provided that one strip leg at a time projects laterally from the mantle of the spring strip which surrounds the fiber core on opposite sides. Here the width of the strip leg is preferably greater than the diameter of the fiber core, in particular by at least 1.5 times, furthermore preferably by at least twice, and in particular by at least 2.4 to 3.0 times the diameter of the fiber core. Otherwise, in this connection, it is preferably provided that the maximum thickness of the strip leg is less than the diameter of the fiber core, preferably by least a factor of 2, furthermore preferably by at least a factor of 3 and in particular by 4 to 8 times the diameter of the fiber core.

As a result, viewed in cross section this yields a thickened middle region with fiber core and coating region adjoined laterally on opposite sides by one mantle leg at a time with a smaller thickness. It has been established in conjunction with the invention that the resilient and/or elastic properties of the spring strip complement one another in a markedly positive manner with the corresponding properties of the foam material of the foam core. The actual spring elasticity is produced by the foam core, while the transfer of the spring action of the spring strips to the foam is ultimately undertaken by the strip legs which have a relatively large area relative to the fiber core.

But, applications are also possible in which mantle legs are omitted, therefore there is only the fiber core with the coating region as a fiber composite core. This application is especially suitable for motor vehicle seats.

In one preferred configuration of the invention, the spring strip is mirror-symmetrical around a central axis of the leg placed in cross section through the strip leg and/or around a central axis of the core placed through the core and running perpendicular to the central axis of the leg. The mirror-symmetrical formation of the spring strip simplifies the arrangement of the individual spring strips in the production of the foam core in accordance with the invention, since in doing so a top-side or bottom-side arrangement of the spring strips need not be considered.

The spring strips can fundamentally be placed in the core base in different ways. In one preferred configuration, it is provided that the spring strips are foamed into the core base. According to the method, it is provided here that the strips are already inserted into a corresponding tool and foamed in place in the production of the foam core. In this alternative, molded foam is preferably used as the foam material.

In another alternative configuration, it is provided that the core base is comprised of at least two parts, specifically an upper core base part and a lower core base part. These parts can have been produced separately as such or also produced first in one piece and have then been cut apart. In this embodiment, the spring strips are located between the two base parts, the two parts then being joined, in particular adhered, to one another on their facing surfaces.

Fundamentally, in conjunction with this invention different foams can be used, specifically in particular cold foam, comfort foam, latex form, molded foam or visco-materials.

Cold foam is generally produced from polyurethane (PU or PUR) and other ingredients in the so-called block foam method, whereby foaming takes place. Based on the material it is not necessary here to cure the foam block of cold foam by heat. This method results in that the cold foam of polyurethane has a higher compression hardness than comfort foam. Therefore, cold foam is also called HR (high resilience=high elasticity) foam.

Moreover, cold foam is characterized by good spot elasticity and body adaptation. Production as a block foam means that large foam blocks are foamed from which then the necessary material parts are cut. Due to the slight gradient in the density within the cold foam block, the cut block parts can have differences in bulk density which are however small. Parts from the lower block part have a higher bulk weight than the parts from the upper part of the cold foam block. Here differences up to a maximum 15% can arise. In any case, cold foam generally has a higher material density than comfort foam.

After a cold foam block has been foamed, almost all pores are closed. But, open porosity of a foam core is important for active respiration. Therefore, in foam parts made from cold foam, after foaming they are driven through a rolling mill. In doing so, the cells are crushed. In many cold foam parts, this process continues during use. From there foam parts of cold foam often become even more active in terms of respiration after use. The body-suitable zones of foam core parts of cold foam are produced by drill holes, cuts and/or surface shaping.

Furthermore, it is possible to use comfort foam for foam cores. For this purpose, PU or PUR which is foamed with the aid of propellants such as carbon dioxide or by contact with water is used. Thus a soft foam is formed from the polyurethane. In addition to PU or PUR, this foam also contains isocyanates and multifunctional alcohols (polyols) which are non-reactive. Therefore, heat is required to cure this foam; this constitutes the major difference from cold foam. Another difference between the cold and comfort foam is that the cells of the comfort foam need not be crushed, but have open pores immediately after production. Here body-suitable zones are subsequently drilled, shaped and/or cut. Altogether, comfort foam is less spot-elastic than cold foam and offers less comfort than the latter.

Molded foam is a high-quality foam which is poured into a mold directly during foaming. This method yields material cores which have a uniform cell structure; this leads to a longer service life. The bulk weight is higher than in a cold foam. Otherwise, in molded foam, based on its manufacture an outer skin forms which increases the dimensional stability of the molded foam. Body-suitable zones are also produced in the pouring process and need not be subsequently cut or shaped into the foam.

Visco foam is a foam with viscoelastic or also thermoplastic properties. This foam has fewer open pores, generally is formed of polyurethane and is especially adaptable, since it hardly offers counter-pressure when loaded. Therefore, a visco foam core still always requires in addition a layer of another foam, in particular cold foam, so that there is supporting force to a sufficient degree. A pocket spring core can also be used as the basis of a visco foam core. The foam adapts precisely under the pressure of the body and by body heat. When the position of the user changes, the foam returns to its original shape. In any case, this takes place rather slowly. Various visco foams are very different. Some are very hard at low room temperature and therefore require some time to adapt to the body. When the visco foam becomes warmer, it requires some few seconds for this purpose (for example, three seconds). The reaction time however depends strongly on the quality and composition of the foam. A visco foam core is extremely spot-elastic and offers very good pressure relief.

Latex foams are produced from synthetic or natural latex (also called natural rubber latex or natural rubber) or a mixture of the two materials. Production takes place by vulcanization, whereby rubber is processed using pressure and heat. In doing so the rubber molecules are crosslinked with one another, as a result of which the substance becomes very elastic. The viscous latex is then poured into a mold in which there are heating pins. The latter provide for the typical ventilation channels in the latex foams. Latex foams are characterized mainly by a high bulk weight, as a result of which cores of a latex foam have a relatively long service life. Otherwise, latex foams are especially elastic, in particular spot-elastic, and offer markedly good body adaptation. Since natural latex foams are formed of natural material, conventionally they are especially well suited to individuals with allergies.

Otherwise, it is also possible to produce a foam core from different layers of latex and other foam materials. In doing so then the properties of the different materials are combined with one another. In all foam types, the respective degree of hardness can generally be chosen and/or set if necessary. The degree of hardness is often established only in latex foams.

The bulk density of the foam of the foam core is between 20 to 80 kg/m$^3$, preferably between 30 kg/m$^3$ and 60 kg/m$^3$, depending on the foam used.

Regardless of the type of production of the foam core, it is suggested that there are a plurality of openings in at least one, preferably in both legs of the spring strip. Here, there can be openings at regular intervals and/or in a repeating arrangement in the respective strip leg. The openings in the embodiment in which there are at least two layers or two core base parts ensure that the sides of the two core base parts facing one another are also joined to one another through the perforations or the openings in the strip legs. This yields an especially strong and intimate connection between the core base parts and the strip legs. In the production alternative of laying the spring strips in foam, the holes and/or the perforation ensure that the partially still liquid and/or foaming foam also travels through the openings into the strip crests so that in this way a very intimate and strong connection of the plastic to the spring strips results.

If conversely two cut foam parts are joined to one another in a sandwich construction with interposed strips via an adhesive connection, the adhesive penetrates through the openings into the strip legs so that a very good connection of the two cut parts over almost the entire area likewise results, ultimately also in the region of the strips.

Fundamentally, a combination of the two aforementioned methods is also possible. Thus it is possible to produce one core base part in a foaming process, and in doing so, to foam the spring strips into the part on the bottom or the top, the outer sides of the spring strips still being exposed.

In this embodiment, the spring strips are laid in foam at least on the bottom and preferably also on the longitudinal sides. Then, another core base piece can be adhered to the core base piece which has the spring strips. In this embodiment, the spring strips can be joined by the foaming process both to the lower foam which has the greater degree of hardness and also to the upper foam which has the lower degree of hardness.

In conjunction with tests which have been carried out, it has been ascertained that the ratio of the free opening area of the openings on the pertinent strip leg surface to the strip leg surface as such is greater than 5%, preferably between 10% to 80%, preferably 20% to 70%, furthermore preferably 30% to 60%, and in particular between 40% and 50%.

To achieve high comfort in conjunction with the foam core in accordance with the invention, it is provided that the lower core base part has a higher degree of hardness, in particular of a denser foam material, than the upper core base part. Moreover, it can be advantageous if at least in the plane of the spring strips on the edge side, in particular circumferentially in the manner of a frame, there is a region of the core base with a higher degree of hardness, in particular with a denser foam material, than the upper core base part. This also increases the comfort of reclining, sitting and leaning in cushioning and/or a mattress or support surface in conjunction with a foam core in accordance with the invention.

In reclining, sitting and leaning tests which have been carried out in conjunction with this invention, it has otherwise been ascertained that the spring strips are located at maximum in the central, preferably in the lower central and in particular in the lower third to lower fifth of the thickness of the core base. In the arrangement of the spring strips in the lower region, the best reclining, sitting or leaning comfort is ultimately achieved.

Furthermore, it is fundamentally possible to make the core base in the manner in accordance with the invention with integrated spring strips, then if necessary on the top and/or bottom side there being at least one further layer of a cushion material, preferably foam material, such as, for example, cushion wadding or foam, which is joined, in particular adhered, to the core base. In doing so, the layer which is optionally provided above the core base should have a lower degree of hardness than the lower core base part or core base. If there is a further layer underneath the core base, this layer should have a greater degree of hardness than the core base and/or the lower core base part or at least the same degree of hardness. In this embodiment, ultimately the core base is made available in the manner of a modular base part, then on the user side by further top and/or bottom layers a foam core being produced for the respective application.

Moreover, the invention relates to a cushion, also in the form of a mattress or support surface, with a foam core of the aforementioned type. The cushion and/or the mattress or support surface in the conventional manner have an outer covering in which the foam core is placed. Between the outer covering and the foam core on the top and/or bottom there can be at least one further layer of cushion wadding and/or a foam, and directly underneath the covering there can be a clamping material, in particular a nonwoven material, preferably a polyester nonwoven material.

Finally, this invention relates to a piece of upholstered furniture in the form of a piece of furniture for sitting or reclining or a motor vehicle seat with at least one foam core of the aforementioned type or a cushion of the aforementioned type. The piece of reclining furniture is in particular a bed. The piece of upholstered furniture or the vehicle seat has a seat part, a reclining part, a mattress and/or a back rest. In the region of the seat part or the reclining part or the mattress and/or a back rest the support surface and/or rest for the cushion or the mattress or the support surface and the foam core there is a first edge and on the opposite side a second edge. The edges can be a component of a circumferential frame, also in the form of a shell or the like. It is important in this connection that the ends of the spring strips extend beyond the first and the second edge so that the first and the second edge are also used as at least indirect support for the spring strips. Structurally the length of the spring strips is greater than the clear distance of the first and the second edge from one another.

In conjunction with a piece of upholstered furniture (furniture for sitting or reclining) or vehicle seat in accordance with the invention it is of special importance that lower cushioning, in particular belts, zigzag springs, wooden slabs or also a spring core can basically be omitted. Ultimately, in the invention the bottom of the cushion, also in the form of a mattress or support surface and/or of the foam core can form the lower functional termination of the cushion structure of the piece of upholstered furniture and/or motor vehicle seat.

Other features, advantages and possible applications of this invention will become apparent from the following description of exemplary embodiments based on the drawings and from the drawings themselves. Here, all described and/or depicted features for themselves or in any combination form the subject matter of this invention.

DETAILED DESCRIPTION OF THE INVENTION

Figure 1:
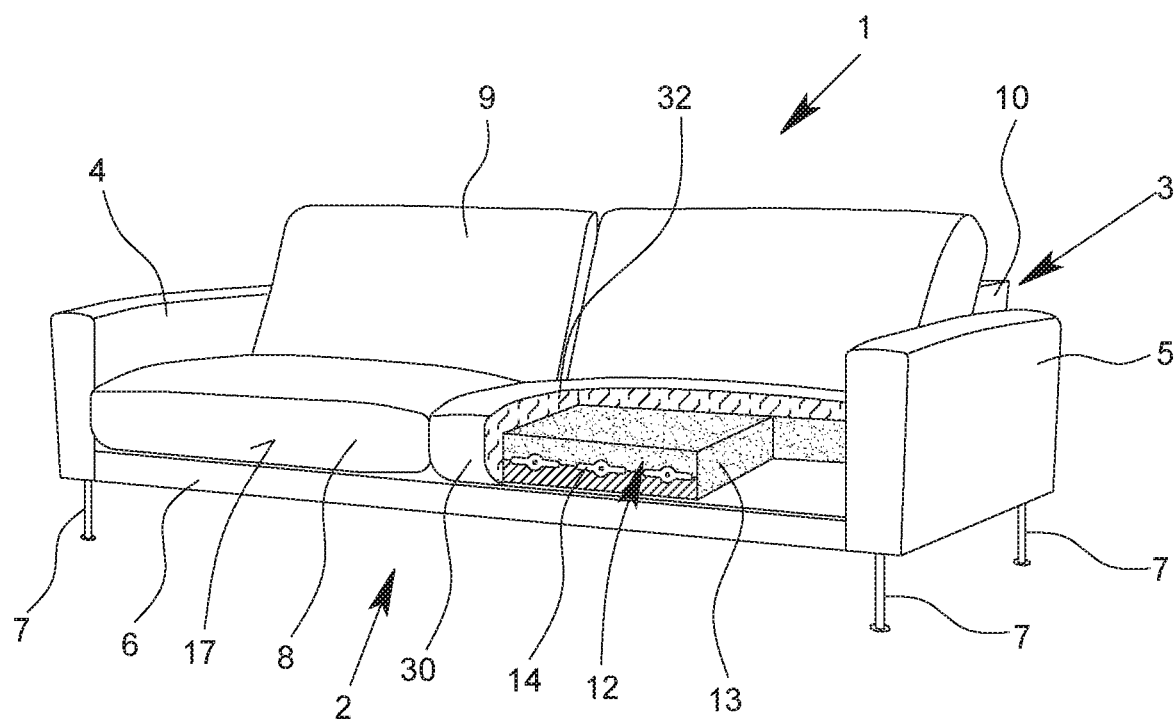
FIG. 1 shows a perspective, partially cutaway view of a piece of upholstered furniture in accordance with the invention.

FIG. 1 shows a piece of upholstered furniture 1, its being a sofa here. The sofa has a seat part 2 and a back rest 3 as well as side cheeks 4, 5. The side cheeks 4, 5 are part of a base 6 which stands on the floor on corresponding feet 7. The seat part 2 here has two cushions 8, while the back rest 3 likewise has two cushions 9. The cushions 8 of the seat part 2 are placed on the base 6, while the cushions 9 of the back rest 3 rest on a rear cheek 10 of the base 6. The cushions 8, 9 of the piece of upholstered furniture 1 are separate elements here which can be removed from the base 6. But it is also fundamentally possible for the cushions 8 and/or 9 not be removable after completion of the piece of upholstered furniture 1.

Figure 2:
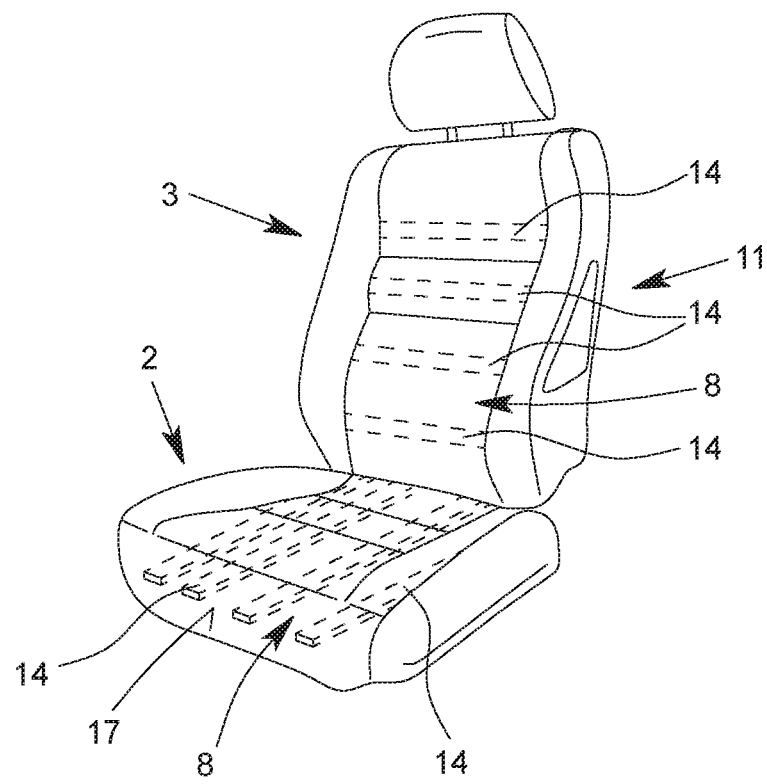
FIG. 2 shows a perspective view of a motor vehicle seat with the indicated spring strips.

FIG. 2 shows a motor vehicle seat 11 which likewise has a seat part 2 and a back rest 3. Here the back rest 3 can be swiveled relative to the seat part 2. The seat part 2 and also the back rest 3 of the vehicle seat 11 each have a cushion 8 which is however tightly joined to the seat part 2 and the back rest 3 respectively. Differently than in the embodiment of the piece of upholstered furniture 1, the cushions 8 for the vehicle seat 11 are not removable, but are an integral component of the seat part 2 and the back rest 3.

In the two embodiments it is such that the cushion 8 has a foam core 12. The foam core 12 has a core base 13 of foam material. The foam material of the core base of the piece of upholstered furniture 1 here is a cold foam, in particular of PU or PUR, while the core base 13 of the cushion 8 of the seat part 2 for the vehicle seat 11 is molded foam, in particular of PU or PUR. The use of comfort foam, visco foam and/or latex or latex foam is also possible.

The preceding and also the following statements apply not only to a cushion of a seat part, but in the same way also to a cushion of a reclining part and a mattress or support surface of a piece of reclining furniture, in particular a bed. Ultimately, a mattress or a support surface of a piece of reclining furniture is nothing but a cushion of the piece of furniture in this respect.

At this point it is significant, and this applies both to the embodiment of the piece of upholstered furniture 1 and also to the embodiment of the vehicle seat 11, that in the core base 13 there are a plurality of spring strips 14 which run preferably at least essentially parallel to one another.

It is pointed out that the spring strips 14 provided in the core base 13 each have an identical shape and execution. But, it is also possible for there to be different spring strips in the core base. Thus, for example, strips of different width and/or strips with different spring properties are easily possible. In the illustrated embodiment of the piece of upholstered furniture 1 only in the cushions 8 of the seat part 2 are there spring strips 14, but not in the cushions 9 of the back rest 3. However, the cushions 9 of the back rest 3 can likewise be provided with spring strips 14. In the embodiment of the vehicle seat 11 there are spring strips 14 in the cushions 8 both of the seat part 2 and also of the back rest 3.

The spring strips 14 which have spring-elastic properties extend lengthwise or transversely between the front and the back face 15, 16 of the core base 13. Relative to the piece of upholstered furniture 1 and/or the vehicle seat 11, the spring strips 14 run either lengthwise or transversely to the front face 17 of the seat part 2. In the illustrated exemplary embodiment, the spring strips 14 in the seat part 2 run transversely to the front face 17, while the spring strips 14 of the cushion 8 of the back rest 3 of the vehicle seat 11 run parallel to the front face 17 of the seat part 2. Instead of the illustrated arrangement of the back strips 14 they can however also be arranged vertically, therefore offset by 90° to the illustrated arrangement. Otherwise the spring strips 14 are in any case arranged at least essentially parallel to the top 18 and/or to the bottom 19 of the core base 13 in the upholstered furniture embodiment. In the vehicle seat embodiment, the spring strips 14 are arranged in one horizontal plane to the top and/or bottom of the core base 13.

FIGS. 10 to 13 show the structure of a spring strip 14. The spring strips 14 which are accommodated in the foam core 12 and/or the core base 13 and integrated therein can be made fundamentally identical, but can also have a different hardness, in particular can be made softer to the sides. Each of the spring strips 14 has one fiber core 20 of a fiber material, in particular of glass fibers, and a mantle 21, in particular of a thermoplastic material, in particular of polypropylene, which surrounds the fiber core 20. The mantle 21 forms the matrix for the fiber core 20. Each of the spring strips 14 has an elongated shape. The stability and bearing capacity of the spring strip 14 are ensured essentially by the fiber core 20. The fiber core 20 forms a strand which in any case has an at least essentially circular solid cross section in the embodiment shown in FIG. 11. Basically, it is also possible for the fiber core 20 to have different cross sectional shapes. Thus for example an elliptical cross sectional shape is possible. A vertical or horizontal arrangement within the mantle 21 then allows corresponding properties of bearing capacity and spring properties of the spring strip 14. Furthermore, angular, in particular rectangular cross sectional shapes of the fiber core 20 are also possible. Moreover, the aforementioned properties can also be influenced by a change of the diameter D of the fiber core 20.

Figure 12:
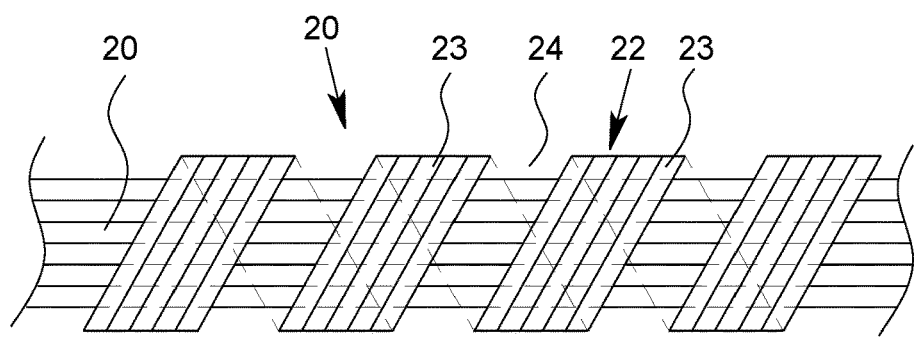
FIG. 12 shows a plan view of the fiber core of a spring strip and FIG. 13 shows a sectional view of one part of a spring strip in accordance with the invention.
Figure 13:
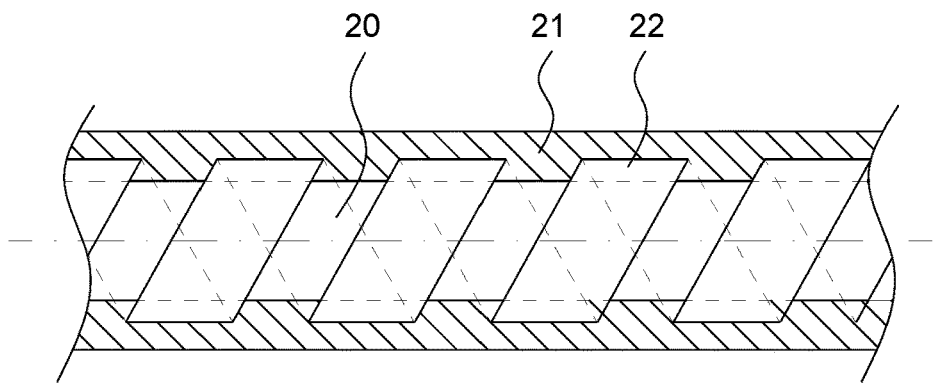

As is apparent from FIGS. 12 and 13, around the strand-shaped fiber core 20 is a winding 22 which surrounds the fiber core 20. The winding 22 consists of the same material as the fiber core 20. Adjacent turns 23 of the winding 22 are spaced apart from one another without contact. This yields intermediate spaces 24 between adjacent turns 23. The intermediate spaces 24 in the longitudinal direction of the fiber core 20 form undercuts for the material of the mantle 21 so that ultimately a type of interlocking arises. As follows in particular from FIG. 13, this leads to a form-fit between the material of the mantle 21 and the fiber core 20. This improves the connection between the material of the mantle 21 and the fiber core 20 which also results essentially from shrink fitting of the outer material onto the inner material in production.

Figure 11:
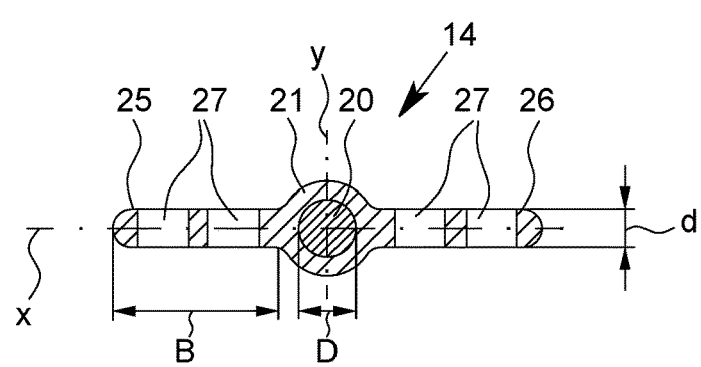
FIG. 11 shows a cross sectional view of the spring strip taken along line VII-VII in FIG. 10 viewed in the arrow direction.

FIG. 11 illustrates that one strip leg 25, 26 of each strip 14 protrudes from each of opposite sides from the mantle 21 which is made essentially annular. The strip legs 25, 26 extend in the radial direction away from the mantle 21. The width B of the strip leg 25, 26 in the illustrated embodiment is greater than the diameter D of the fiber core 20 by more than the factor of 2, here roughly by the factor 2.5, specifically preferably by the factor of 4 to 5. Otherwise, the thickness d of the strip leg 25, 26 is much smaller than the diameter D of the fiber core 20. This results in a spring strip 14 with a thickened central region and relatively narrow elongated strip legs 25, 26 which extend over the entire length of the spring strip 14. Due to the relative [sic] long strip legs 25, 26 there results good a joining possibility of the strip leg 25, 26 to the surrounding foam of the core base 13.

Otherwise, FIG. 11 shows that the spring strip 14 viewed in cross section is mirror-symmetrical around one central axis x of the leg placed through the strip leg 25, 26 and around one central axis y of the core placed through the diameter D of the fiber core 20 and running perpendicular to the central axis x of the leg. This symmetry simplifies the production of a fiber core 12 in accordance with the invention since a certain alignment of the spring strips 14 in the production of the foam core 12 need not be considered.

Figure 10:
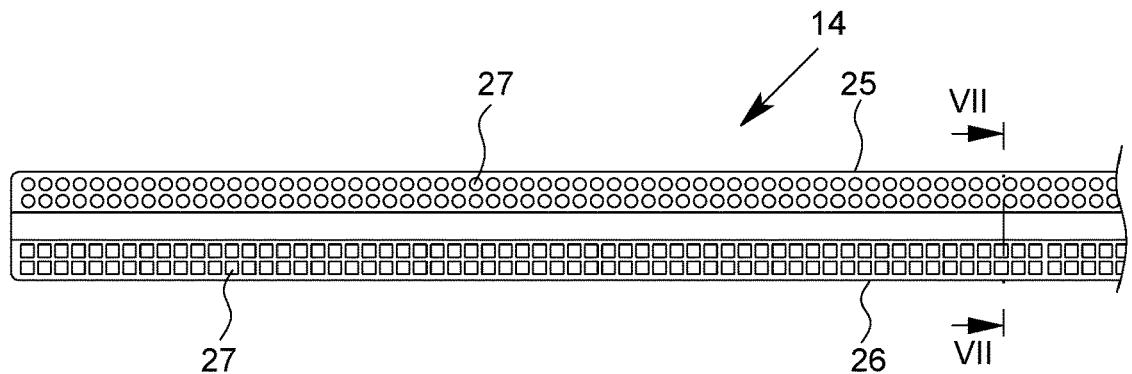
FIG. 10 shows a plan view of a spring strip in accordance with the invention with different perforating.

As FIG. 10 in particular shows, in each strip leg 25, 26 there are a plurality of openings 27. There are openings 27 at regular intervals and/or in a repeating arrangement in the strip leg 25, 26. In the embodiment shown in FIG. 10, the openings 27 in the strip leg 25 have a round shape, while in the strip leg 26 there are rectangular openings 27. This type of arrangement of openings 27 is used to not only represent possibilities of the formation of openings 27. Generally, the openings 27 in both strip legs 25, 26 for a spring strip 14 have the same opening shape, but in any case the free opening area, i.e. the sum of the opening areas of all openings 27, should be relatively large. In any case the free opening area of the openings 27 relative to the total area of the respective strip leg 25, 26 should be greater than 20%.

Figure 3:
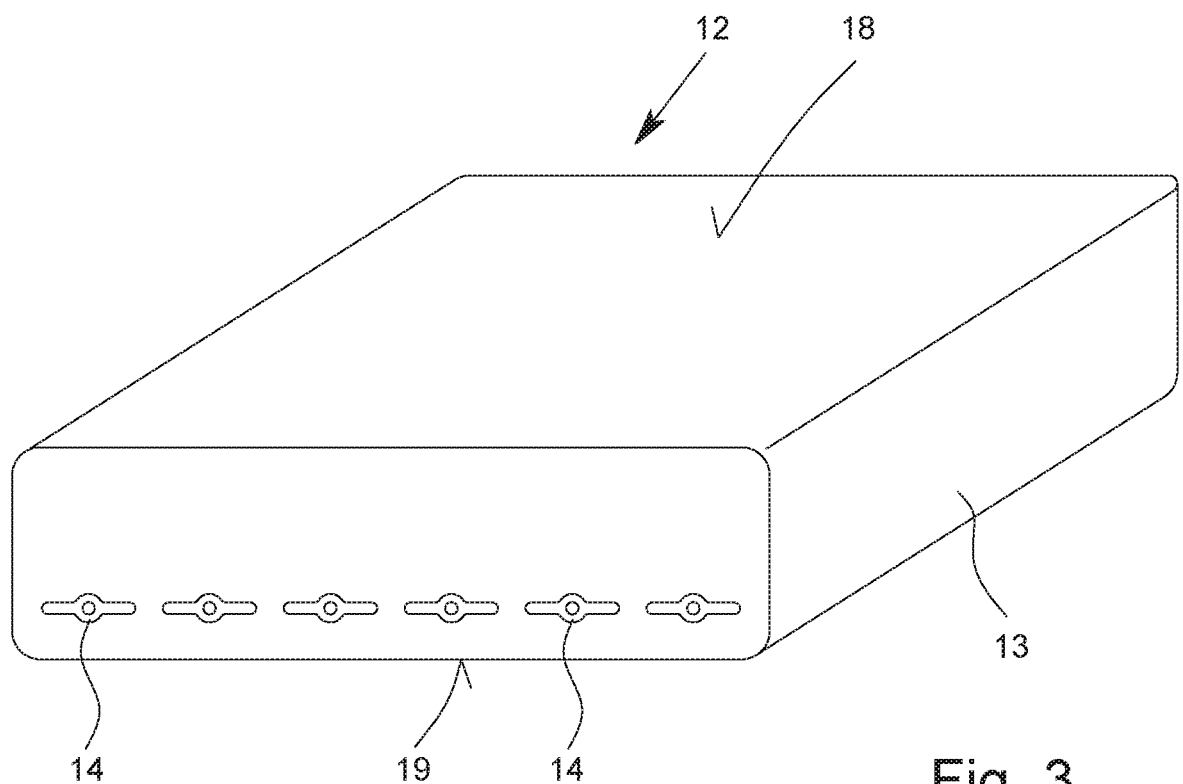
FIG. 3 shows a perspective view of a foam core in accordance with the invention, cut on the front.
Figure 4:
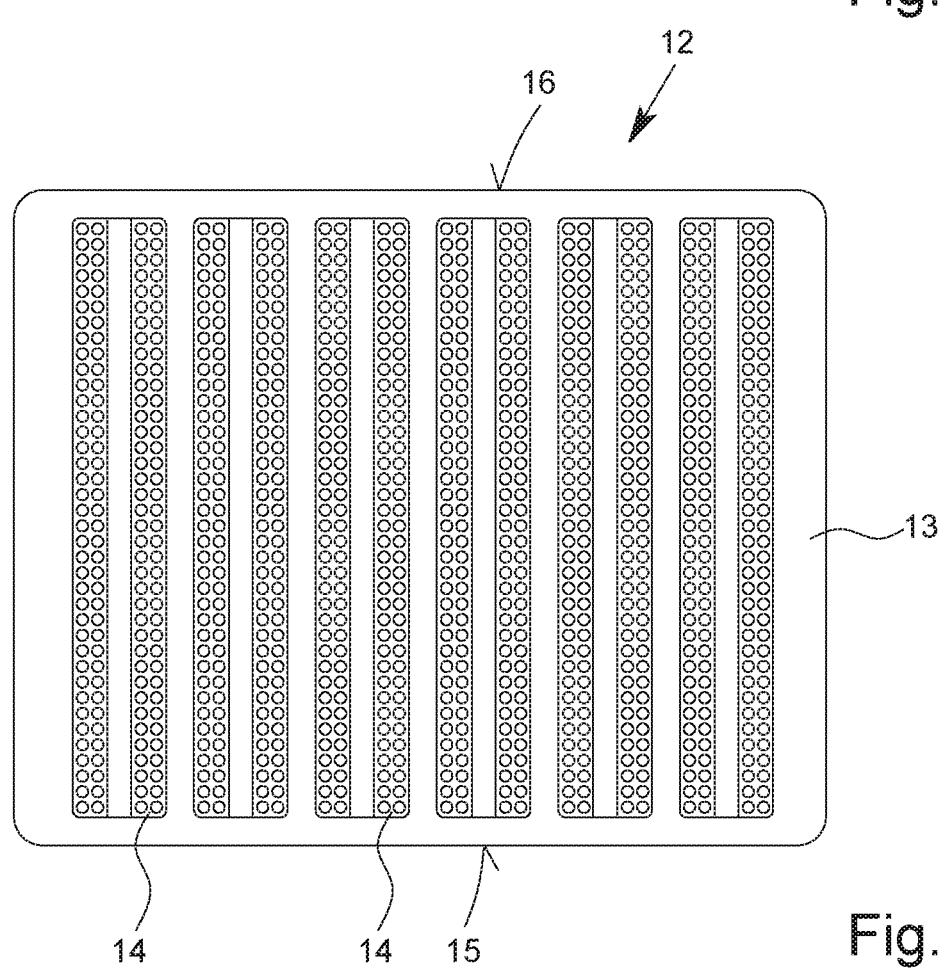
FIG. 4 shows a sectional view of a foam core in accordance with the invention in a plan view.

FIG. 3 shows a fiber core 12, whereby the spring strips 14 have been foamed into the core base 13. The foam material used is molded foam. The spring strips 14 in the embodiment according to FIG. 3 are located in the region of the lower third of the core base 13, whereby the foam material above and underneath the spring strips 14 is identical. As follows from FIG. 4, the spring strips 14 extend from the front face 15 to the back face 16, the respective ends of the spring strips 14 not lying exposed, but being enclosed also by the foam material of the core base 13. But it should be pointed out that it is fundamentally also possible for the two ends of the respective spring strips 14 to lie exposed on the front face 15 and/or back face 16 of the core base 13, therefore to be visible to an onlooker.

The foam core shown in FIG. 3 is intended for a cushion of a seat part 2. In the case of a mattress or support surface, only the length of the foam core 12 and the number of spring strips 4 are greater. Otherwise there are no differences in type and structure, as was already pointed out at the beginning.

Figure 5:
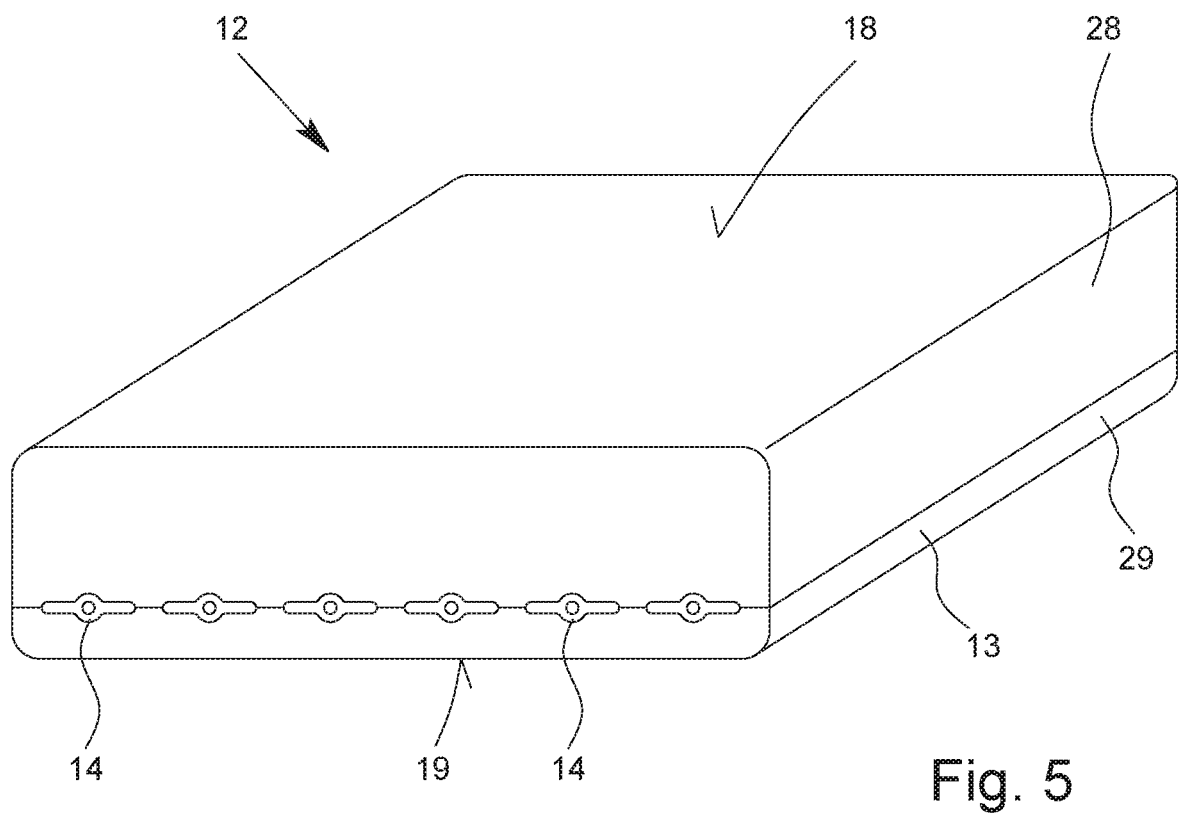
FIG. 5 shows a view of another embodiment of a foam core in accordance with the invention corresponding to FIG. 3.

In the embodiment shown in FIG. 5, the core base 13 has been produced differently. The core base 13 here has an upper core base part 28 and a lower core base part 29. It is cut foam here, for example, of cold foam. Both core base parts have the same surface area, but a different thickness. To produce the foam core 12, adhesive is applied to the top of the lower core base part 29. Then the spring strips 14 are put in place in the desired arrangement. Then adhesive is applied again to the top of the spring strips 14. Then the upper core base part 28 is put in place and pressed against the lower core base part 30 and the interposed spring strips 24 and thus adhered.

Both in foaming and also in the above described production method by means of adhering, the openings 27 are used for tight joining of the spring strips 14 to the foam material, specifically when laying in foam, in that the foam penetrates through the openings 27, while in the other embodiment the adhesive penetrates through the openings 27.

Instead of the production method described in FIG. 5, it is also fundamentally possible to replace the upper core base part 28 or the lower core base part 29 by a foaming process, whereby the pertinent spring strips 14 then lying exposed on the respective bottom or top. Then the other core base part can be joined by an adhesive connection to the core base part produced by foaming.

Figure 6:
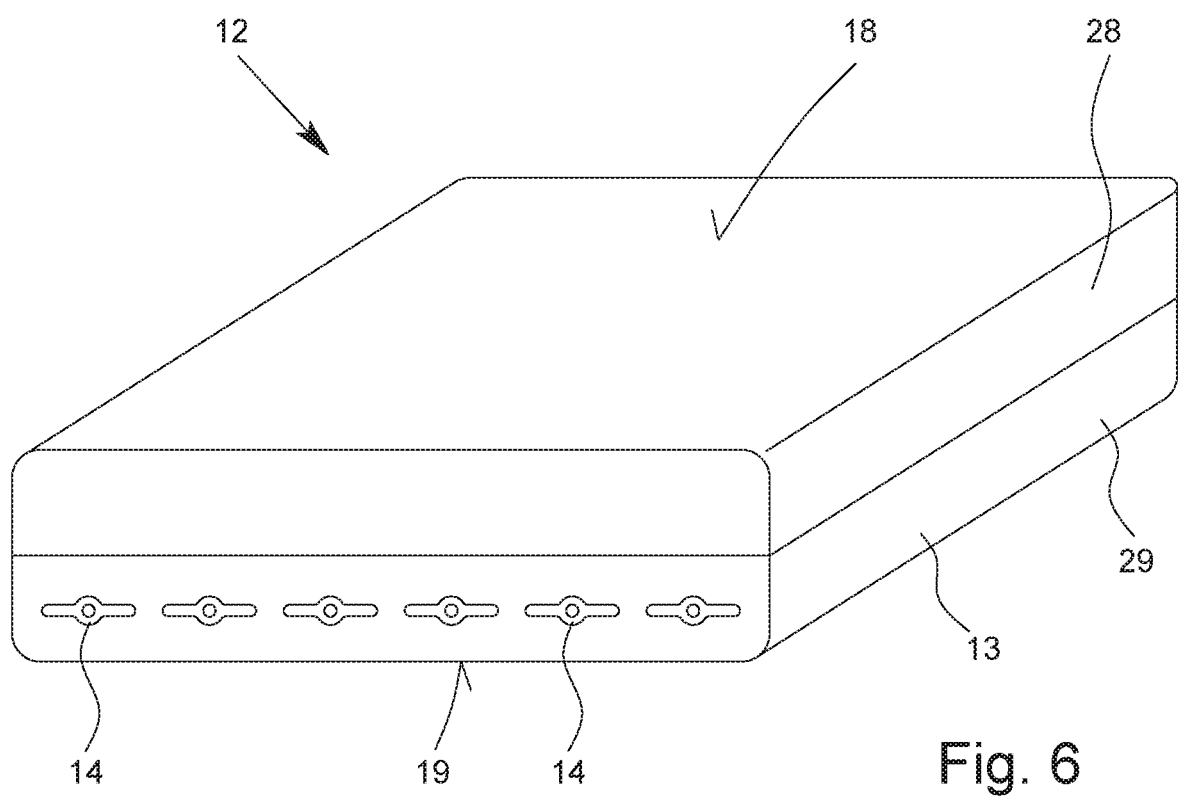
FIG. 6 shows another embodiment of a foam core in accordance with the invention corresponding to FIG. 3.

In the embodiment shown in FIG. 5 the lower core base part 29 can have a higher degree of hardness than the upper core base part 28. The higher degree of hardness can be produced for example by a denser plastic material or a different plastic material with a corresponding increased degree of hardness. In any case it should preferably be such that at least the part of the foam material of the core base which is located underneath the plane of the spring strip 14 is harder, therefore has a higher degree of hardness than the region of the foam core which is located on the top 18. One embodiment in this respect is shown in FIG. 6. There, for example, the core base 13 has been produced by foaming with a foam with a higher degree of hardness. This foamed part ultimately forms the lower core base part 29. The upper core base part 28 is applied as another layer to the lower core base part and joined for example via an adhesive connection.

It should be pointed out that it is fundamentally possible to provide other layers on the top and/or bottom of the base part which has spring strips 14, and the layers provided on the top can have fundamentally a lower degree of hardness, but also the same degree of hardness as the layers provided in the lower region of the core base 13.

Figure 7:
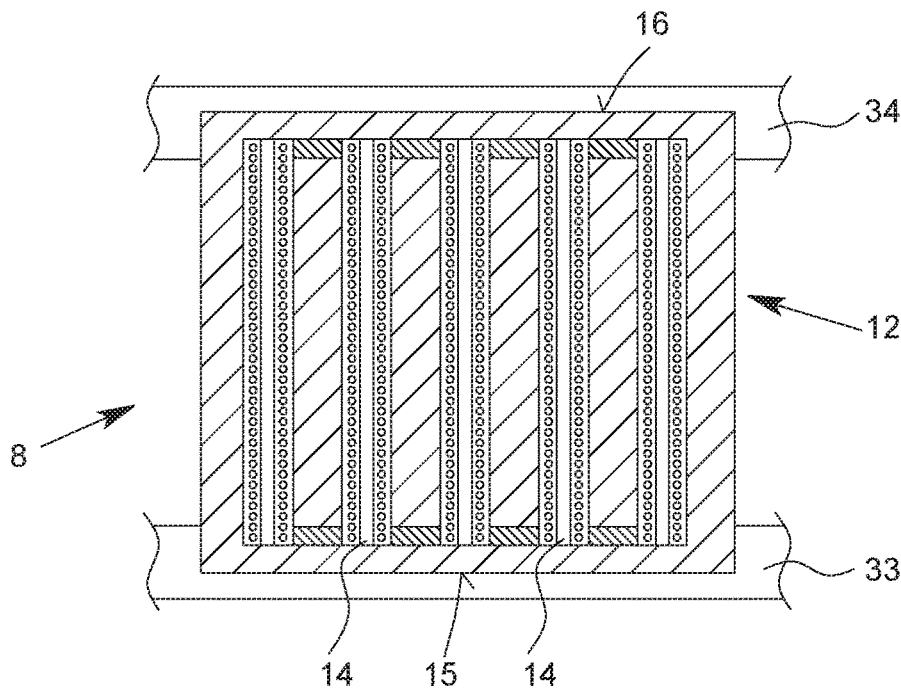
FIG. 7 shows a schematic section of a foam core in accordance with the invention in a plan view in the state placed on a seat part.
Figure 8:
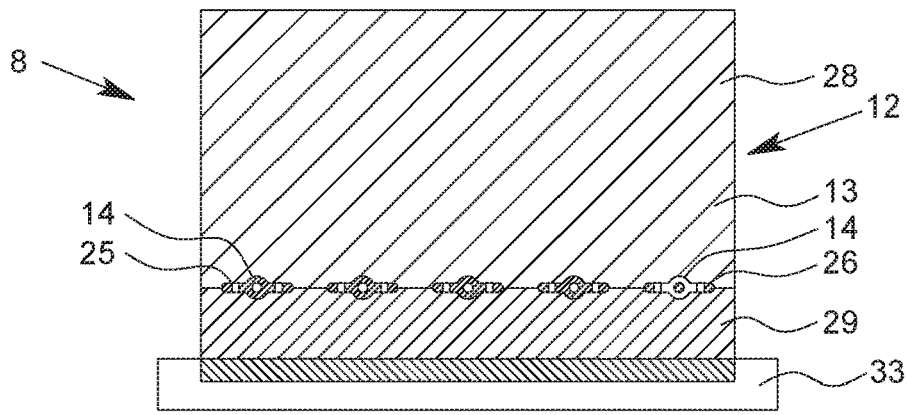
FIG. 8 shows a schematic sectional view of a foam core in accordance with the invention in a side view in the state placed on a seat part.

FIGS. 7 and 8 show an embodiment in which in the plane of the spring strips 14 on the edge side circumferentially in the manner of a frame there is a region of the core base 13 with a higher degree of hardness than the degree of hardness of the foam of the upper core base part. In doing so, the spring strips 14 are placed not only on the lower core base part 29, but also with the strip legs 25, 26 blanket the material of the lower core base part 29 and are partially embedded therein. This then yields the reinforced frame function.

While the foam core 12 in the upholstered furniture embodiment has essentially a rectangular shape, the foam core 12 for the vehicle seat 11, and both with respect to the seat part 2 and also the back rest 3, is rather a shell-like body with side cheeks. The embodiment shown in FIG. 9 is a cross sectional view of the cushion 8 for the back rest 3, the spring elements 14 running transversely to the cheeks of the back rest 3, while the spring strips 14 for the seat part 2 are aligned at least essentially in the direction of the seat cheeks.

Figure 9:
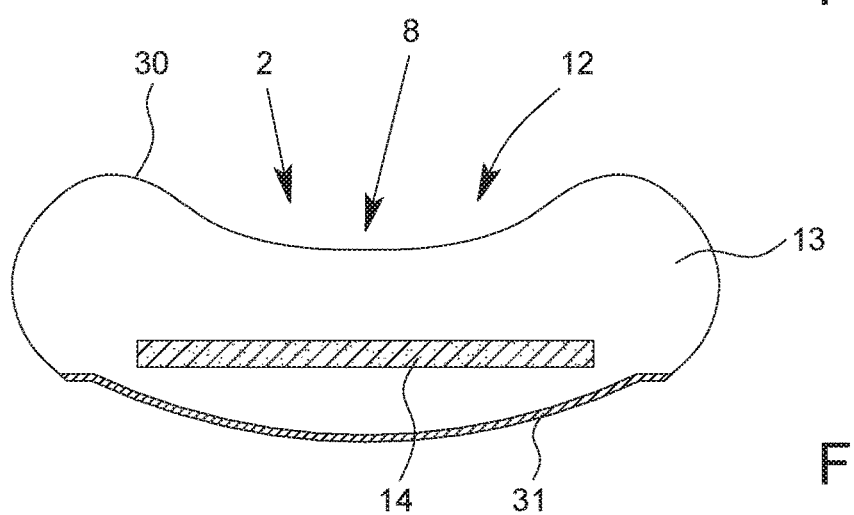
FIG. 9 shows a schematic sectional view of a foam core for a motor vehicle seat.

On the side facing the user, the cushion 8 in the embodiment according to FIG. 9 has a covering 30, while on the side facing away from the user there is a metal part 31 which ultimately forms a support for the foam core 12 and also the spring strips 14.

The embodiment according to FIG. 1 illustrates that the cushion 8 likewise has an outer covering 30. Furthermore, between the foam core 12 and the covering 30 is a layer 32 with cushion wadding. Between the layer 32 and the covering 30 there can be another clamping material in the form of a nonwoven material, in particular polyester nonwoven material.

FIGS. 7 and 8 illustrate the principle of the arrangement and support of the foam core 1 on the seat part 2 or the back rest 3. The following statements relate to the seat part 2 of the piece of upholstered furniture 1, but also apply in the same way to the embodiment with the vehicle seat 11, and both to the seat part 2 and also to the back rest 3.

The seat part 2 here on the base 6 has a first edge 33 and a second edge 34. The first edge 33 is adjacent to the front face 17, while the second edge 34 is opposite the first edge 33 and adjacent to the back rest 3. In the region of the back rest 3 of the vehicle seat 1 are the supporting edges laterally on a rigid part of the back rest, for example on a frame.

FIG. 7 illustrates that the cushion 8 is placed on the edges 33, 34, therefore is supported on them. Here the spring strips 14 have a length such that they likewise overlap the edges 33, 34 with their ends, viewed from overhead. The length of the spring strips 14 is therefore greater than the clear distance of the two edges 33, 34 to one another. In any case, with corresponding loading of the cushion 8 the spring strips 14 are thus also indirectly supported on their ends on the respective edges 33, 34.

Otherwise, it is such that, underneath the cushion 8, in any case, in the upholstered furniture embodiment, there is no lower cushioning or a spring core. The bottom of the cushion 8 forms the lower termination of the cushion structure in any case in a functional respect. It goes without saying that there can be lower under-clamping which however with respect to the cushioning does not assume any bearing or spring properties. The corresponding applies to reclining furniture when the cushion 8 is a mattress or support surface.

What is claimed is:

1. A foam core for a cushion of one of a seat part, a reclining part, a back rest, a mattress or other support surface, comprising:
    a core base of foam material containing a plurality of spring strips,
    wherein at least one spring strip has a fiber core and a mantle of a thermoplastic material which surrounds the fiber core, and
    wherein the spring strips have been foamed into the core base in a manner forming a layered structure in the form of foam-spring strips-foam, and
    wherein the fiber core of the spring strip has a fiber core strand and a winding which at least in part helically surrounds the fiber core strand so that intermediate spaces are formed for interlocking with the thermoplastic material of the mantel.

2. The foam core as claimed in claim 1, wherein the spring strips extend at least one of between a front and back face of the core base; or essentially parallel to at least one of a top or bottom of the core base.

3. The foam core as claimed in claim 1, wherein a strip leg protrudes from the mantle on each of opposite sides thereof.

4. The foam core as claimed in claim 3, wherein the strip leg has a width that is greater than a diameter of the fiber core.

5. The foam core as claimed in claim 3, wherein a maximum thickness of the strip leg is smaller than the diameter of the fiber core.

6. The foam core as claimed in claim 3, wherein the spring strip is mirror-symmetrical around a central axis of at least one the strip leg or of the core running perpendicular to the central axis of the leg.

7. The foam core as claimed in claim 1, wherein the spring strips are embedded in a foam into the core base.

8. A foam core for a cushion of one of a seat part, a reclining part, a back rest, a mattress or other support surface, comprising:
    a core base of foam material containing a plurality of spring strips,
    wherein at least one spring strip has a fiber core and a mantle of a thermoplastic material which surrounds the fiber core, and
    wherein the spring strips have been foamed into the core base in a manner forming a layered structure in the form of foam-spring strips-foam, and
    wherein each strip leg has a plurality of openings.

9. The foam core as claimed in claim 1, wherein a lower core base part has a higher degree of hardness than an upper core base part.

10. The foam core as claimed in claim 1, wherein the spring strips are located in a central region of the core base.

11. The foam core as claimed in claim 1, wherein the core base has at least one further layer of a cushion material above the core base having a lower degree of hardness than the core base.

* * * * *